Patented Nov. 25, 1952

2,619,429

UNITED STATES PATENT OFFICE 2,619,429

PREPARATION OF WATER SOLUBLE POTASSIUM POLYMETAPHOSPHATE FROM POTASSIUM KURROL SALT

Edward C. Broge, Cecil County, Md., assignor to E. I. du Pont de Nemours and Company, Wilmington, Del., a corporation of Delaware No Drawing. Application November 15, 1950, Serial No. 195,903

12 Claims. (Cl. 106—286)

This invention relates to processes for modifying potassium Kurrol salt and is more particularly directed to processes in which a water-soluble potassium polymetaphosphate is prepared by dissolving potassium Kurrol salt in aqueous hydrogen peroxide. The invention is further directed to compositions and articles of manufacture comprising potassium polymetaphosphate and hydrogen peroxide.

Potassium Kurrol salt is ordinarily not soluble in water. Heretofore, it could be solubilized by the introduction of a foreign ion such as sodium ion. Now I have found that by dissolving potassium Kurroll salt in aqueous hydrogen peroxide a water-soluble potassium polymetaphosphate is obtained.

The water-soluble potassium polymetaphosphate produced in accordance with my invention is free of foreign cations. It may be recovered from the aqueous hydrogen peroxide solution by evaporating off the water and hydrogen peroxide or, preferably, by adding to the solution a water-miscible organic solvent to coagulate the potassium polymetaphosphate.

Potassium polymetaphosphate for treatment according to the invention is thought to be a linear polymer, crystalline in structure. Customarily, the potassium polymetaphosphate suitable for use according to my invention is called potassium Kurrol salt.

The potassium Kurrol salt and its preparation are well known in the literature and reference may be had, for instance, to an article by Karbe and Jander, Kolloid-Beihefte, 54, 105–120 (1943).

Of the methods shown in the art for preparing the potassium Kurrol salt, I prefer the one in which pure potassium dihydrogen orthophosphate is heated at a temperature of about 800° C. for a period sufficient to permit dehydration, and the resulting material then cooled. The product thus produced is water insoluble and crystalline.

The water-insoluble potassium polymetaphosphate prepared as described above may be solubilized with aqueous hydrogen peroxide in several ways. A preferred method comprises adding the crystalline potassium Kurrol salt to the aqueous solution of hydrogen peroxide and agitating the resulting suspension until the potassium polymetaphosphate dissolves. Another method of carrying out the process of my invention is to add hydrogen peroxide to an aqueous suspension of the potassium Kurrol salt, heating and thoroughly agitating the resulting mixture.

In other words, my novel process of solubilizing potassium Kurrol salt without substantial depolymerization consists in treating crystalline potassium polymetaphosphate with hydrogen peroxide in the presence of water.

The aqueous hydrogen peroxide solutions employed in the process of my invention should not be too dilute. Generally speaking, solutions containing 3% or more by weight of hydrogen peroxide are preferred. At a 5% $H_2O_2$ concentration, for example, the solution resulting after the addition thereto of the potassium Kurrol salt is a viscous liquid. The more concentrated the hydrogen peroxide solution the more rapid will be the rate of dissolution of the potassium Kurrol salt. As a practical matter, solutions containing more than 35% by weight of hydrogen peroxide are not usually employed.

The hydrogen peroxide employed in my novel process may be ordinary commercial hydrogen peroxide, provided it is freed of acid stabilizers. Typical products on the market which may be used include aqueous solutions of hydrogen peroxide which contain about 30.5 to 31.1 grams $H_2O_2$ per 100 mls. at 20° C., or about 27.6 per cent $H_2O_2$ by weight. The acid stabilizers frequently present in commercial grades of hydrogen peroxide are neutralized, preferably by means of potassium hydroxide, prior to use in order to avoid excessive degradation of the potassium Kurrol salt. Hydrogen peroxide prepared from barium peroxide or freshly distilled is particularly suitable for use in accordance with the invention.

The pH of the aqueous solutions of hydrogen peroxide is preferably maintained within the range of about 6 to about 10 in order to avoid degradation of the potassium Kurrol salt. Since the pH of an aqueous solution of pure hydrogen peroxide is about 6, or slightly higher, it is advantageous in certain instances to add a small amount of a base, preferably potassium hydroxide.

The concentration of potassium Kurrol salt in the previously described aqueous hydrogen peroxide solutions is comparatively unimportant. Generally, it is not desirable to have more than about 10% by weight of potassium Kurrol salt present. As the concentration of the Kurrol salt goes above 10%, the resulting product solution becomes increasingly viscous and more difficult to handle. It is preferred to use enough of the potassium Kurrol salt to produce at least a one-half per cent solution. If less than the amount is used, the reaction will proceed somewhat too slowly. Solutions of very low concentrations are not as useful, particularly in cases in which the solid product is to be separated, since such processes would require the removal of larger amounts of water.

The water-soluble potassium polymetaphosphate dissolved in aqueous solutions of hydrogen peroxide may be recovered therefrom by several methods. One method comprises "drying down" the solutions to self-supporting films of potassium polymetaphosphate plasticized with adsorbed water and hydrogen peroxide. These may be desorbed by heating the film in vacuo. These aqueous solutions prior to being concentrated are stable for extended periods of time provided the pH is kept slightly on the alkaline side.

My preferred method of recovering the water-soluble form of potassium polymetaphosphate from aqueous hydrogen peroxide solutions is to add to the solution a water-miscible organic solvent. This addition brings about a coagulation of the desired product which still contains some peroxide. The coagulated product may then be collected and the coagulent squeezed out of it. The potassium polymetaphosphate may be further dried and purified, if desired, using a water-miscible organic liquid other than the coagulant.

The coagulants employed in the process described above include any water-miscible organic solvent, preferably, ethanol or acetone. In the event that glycerine is employed, it should be used in exceedingly large amounts. Other examples, of water-miscible organic solvents suitable for use in the invention are methanol, propanol, isopropanol, butanol, methyl ethyl ketone, butyl Carbitol, ethyl Cellosolve, dioxane and the like. Obviously, it is undesirable to employ compounds as coagulants which are unstable in the presence of hydrogen peroxide.

For complete removal of hydrogen peroxide from the soluble polymetaphosphate it is necessary to redissolve the product to get an aqueous solution containing the potassium polymetaphosphate-hydrogen peroxide mixture and precipitate out the polymetaphosphate by means of large amounts of a water-miscible organic solvent such as ethyl alcohol. The starch-iodide test may be employed to determine the point at which the resulting precipitate is substantially free from hydrogen peroxide.

Surprisingly, even after the complete removal of the hydrogen peroxide the potassium polymetaphosphate prepared in accordance with my invention does not lose its ability to dissolve immediately in water.

It is desirable that the solubilization reaction be conducted as rapidly as convenient, preferably in a matter of minutes, in order to avoid degradation of the potassium polymetaphosphate. The rate of solution of the potassium polymetaphosphate into the aqueous solution containing hydrogen peroxide may be accelerated by heating the solution to a temperature somewhat above room temperature, for instance 40° C. Usually, however, it is preferred to maintain the temperature of the reactants at or somewhat below room temperature. Depolymerization of the product may occur if reaction temperatures above 50° C. are employed.

The rate of dissolution of the potassium polymetaphosphate in aqueous solutions of hydrogen peroxide is not only dependent upon the temperature of the aqueous solution and the concentration of the hydrogen peroxide therein, but also on type of agitation employed. Vigorous stirring of the reaction mixture will, of course, accelerate the rate at which the water-insoluble potassium Kurrol salt is solubilized.

According to the present invention for modifying potassium Kurrol salt, the potassium Kurrol salt is generally treated with aqueous hydrogen peroxide to the point of complete solution. It is to be understood that, if desired, the solubilization process may be stopped short of complete dissolution, particularly in those instances wherein a finely divided potassium Kurrol salt is employed.

The products produced in accordance with my invention can be used as film-forming compositions, in binding compositions and in coating compositions.

In order that the invention may be better understood, reference should be had to the following illustrative example:

A high molecular weight potassium polymetaphosphate is prepared by heating pure potassium dihydrogen phosphate to a temperature of about 800° C. for a period of about forty minutes. The resulting crystalline product is quickly cooled. This product is a potassium Kurrol salt.

One part by weight of the finely pulverized crystalline potassium polymetaphosphate obtained in the described manner is stirred with 50 parts by weight of an aqueous solution consisting of water and 7 parts by weight of hydrogen peroxide. The suspended potassium polymetaphosphate goes into solution rapidly. To the resulting solution there is added ethyl alcohol in an amount sufficient to coagulate the water-soluble potassium polymetaphosphate. The coagulated product is filtered from the solution and treated with acetone to remove the main portion of residual hydrogen peroxide. The dried product is dissolved in water and a film cast therefrom.

I claim:

1. In a process for the production of a water-soluble potassium polymetaphosphate, the step comprising contacting potassium Kurrol salt with a solution of hydrogen peroxide.

2. In a process for the production of a water-soluble potassium polymetaphosphate, the step comprising dissolving potassium Kurrol salt in an aqueous solution of hydrogen peroxide.

3. In a process for the production of a water-soluble potassium polymetaphosphate, the step comprising dissolving potassium Kurrol salt in an aqueous solution of hydrogen peroxide, said solution having a pH within the range of from 6 to 10.

4. In a process for the production of a water-soluble potassium polymetaphosphate from potassium Kurrol salt, the step comprising mixing an aqueous suspension of potassium Kurrol salt with hydrogen peroxide, said aqueous suspension having a pH of at least 6 but not exceeding 10.

5. In a process for the production of a water-soluble potassium polymetaphosphate, the steps comprising dissolving potassium Kurrol salt in an aqueous solution of hydrogen peroxide and separating from the resulting solution the water-soluble potassium polymetaphosphate so produced.

6. In a process for solubilizing potassium Kurrol salt, the steps comprising dissolving potassium Kurrol salt in an aqueous solution of hydrogen peroxide having a pH within the range of from 6 to 10, and subsequently adding to the resulting solution a water-miscible organic solvent to coagulate the water-soluble potassium polymetaphosphate so formed.

7. In a process for the production of a water-soluble potassium polymetaphosphate, the steps comprising dissolving water-insoluble potassium Kurrol salt in an aqueous solution of hydrogen peroxide having a pH within the range of from 6 to 10, and subsequently recovering the water-soluble potassium polymetaphosphate from the resulting solution by heating in vacuo.

8. A composition comprising potassium polymetaphosphate and hydrogen peroxide.

9. An aqueous solution comprising potassium polymetaphosphate and hydrogen peroxide.

10. A solid comprising potassium polymetaphosphate and hydrogen peroxide.

11. The composition of claim 8 in the form of a self-supporting film.

12. In a process for the production of a water-soluble potassium polymetaphosphate, the steps comprising dissolving potassium Kurrol salt in an aqueous solution of hydrogen peroxide and coagulating from the resulting solution the water-soluble potassium polymetaphosphate so produced.

EDWARD C. BROGE.

REFERENCES CITED

The following references are of record in the file of this patent:

Annales Chimie, vol. 16, pp. 395–477 (1941), article by Bonneman-Bemia.